US011968379B2

(12) United States Patent
Gao et al.

(10) Patent No.: US 11,968,379 B2
(45) Date of Patent: Apr. 23, 2024

(54) VIDEO DECODING METHOD AND APPARATUS, VIDEO ENCODING METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Xinwei Gao, Shenzhen (CN); Weiran Li, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 260 days.

(21) Appl. No.: 17/469,729

(22) Filed: Sep. 8, 2021

(65) Prior Publication Data

US 2021/0409738 A1 Dec. 30, 2021

Related U.S. Application Data

(63) Continuation of application No. PCT/CN2020/116642, filed on Sep. 22, 2020.

(30) Foreign Application Priority Data

Sep. 27, 2019 (CN) .......................... 201910927094.X

(51) Int. Cl.
*H04N 19/30* (2014.01)
*H04N 19/119* (2014.01)
(Continued)

(52) U.S. Cl.
CPC ........... *H04N 19/30* (2014.11); *H04N 19/119* (2014.11); *H04N 19/176* (2014.11); *H04N 19/70* (2014.11)

(58) Field of Classification Search
CPC .............................. H04N 19/30; H04N 19/119
See application file for complete search history.

(56) References Cited

U.S. PATENT DOCUMENTS 11,553,191 B2 * 1/2023 Hendry ................ H04N 19/119
11,601,646 B2 * 3/2023 Lee ...................... H04N 19/119
(Continued)

FOREIGN PATENT DOCUMENTS

CN 101282479 A 10/2008
CN 102883157 A 1/2013
(Continued)

OTHER PUBLICATIONS

Tencent Technology, ISR, PCT/CN2020/116642, Dec. 21m 2020, 2 pgs.

(Continued)

*Primary Examiner* — Irfan Habib
(74) *Attorney, Agent, or Firm* — Morgan, Lewis & Bockius LLP

(57) ABSTRACT

Disclosed is a video decoding method, including: obtaining a current video frame, the current video frame being partitioned into a plurality of regions; obtaining a syntax element carried in syntax data corresponding to each of the plurality of regions, the syntax element being used for indicating a resolution used to decode the region, and a plurality of resolutions used to decode the plurality of regions including at least two different resolutions; and decoding the each of the plurality of regions by using the resolution corresponding to the region. The plurality of resolutions are determined according to a transmission bandwidth of a video stream including the current video frame from a source to a destination, e.g., by comparing the transmission bandwidth with a preset bandwidth threshold.

14 Claims, 10 Drawing Sheets

(51) Int. Cl.
H04N 19/176 (2014.01)
H04N 19/70 (2014.01)

(56) References Cited

U.S. PATENT DOCUMENTS

| | | | | |
|---|---|---|---|---|
| 2017/0251204 | A1* | 8/2017 | Gupte | H04N 19/597 |
| 2021/0168404 | A1* | 6/2021 | Lim | H04N 19/513 |
| 2021/0329265 | A1* | 10/2021 | Wang | H04N 19/30 |
| 2022/0078454 | A1* | 3/2022 | Gao | H04N 19/172 |
| 2022/0360802 | A1* | 11/2022 | Kalva | H04N 19/112 |
| 2023/0052774 | A1* | 2/2023 | Kim | H04N 19/30 |

FOREIGN PATENT DOCUMENTS

| | | |
|---|---|---|
| CN | 105827866 A | 8/2016 |
| CN | 105900425 A | 8/2016 |
| CN | 107592972 A | 1/2018 |
| CN | 108495130 A | 9/2018 |
| CN | 109194923 A | 1/2019 |
| CN | 109525842 A | 3/2019 |
| CN | 110121885 A | 8/2019 |
| CN | 110650357 A | 1/2020 |
| WO | WO 2019059721 A1 | 3/2019 |

OTHER PUBLICATIONS

Tencent Technology, WO, PCT/CN2020/116642, Dec. 21, 2020, 4 pgs.
Tencent Technology, IPRP, PCT/CN2020/116642, Mar. 15, 2022, 5 pgs.

* cited by examiner

VIDEO DECODING METHOD AND APPARATUS, VIDEO ENCODING METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/116642, entitled "VIDEO DECODING METHOD AND APPARATUS, VIDEO ENCODING METHOD AND APPARATUS, STORAGE MEDIUM, AND ELECTRONIC DEVICE" filed on Sep. 22, 2020, which claims priority to Chinese Patent Application No. 201910927094. X, entitled "VIDEO DECODING METHOD AND APPARATUS" filed with the China National Intellectual Property Administration on Sep. 27, 2019, all of which are incorporated herein by reference in their entirety.

This application is related to U.S. application Ser. No. 17/469,710, entitled "VIDEO DECODING METHOD AND APPARATUS, VIDEO ENCODING METHOD AND APPARATUS, STORAGE MEDIUM, AND ELECTRONIC DEVICE" filed on Sep. 8, 2021, which is incorporated by reference in its entirety.

This application is related to U.S. application Ser. No. 17/469,716, entitled "VIDEO ENCODING METHOD AND APPARATUS, VIDEO DECODING METHOD AND APPARATUS, ELECTRONIC DEVICE, AND READABLE STORAGE MEDIUM" filed on Sep. 8, 2021, which is incorporated by reference in its entirety.

This application is related to U.S. application Ser. No. 17/469,721, entitled "VIDEO ENCODING METHOD, VIDEO DECODING METHOD, AND RELATED APPARATUSES" filed on Sep. 8, 2021, which is incorporated by reference in its entirety.

FIELD OF THE TECHNOLOGY

This application relates to the field of computers, and specifically, to a video decoding method and apparatus, a video encoding method and apparatus, a storage medium, and an electronic device.

BACKGROUND OF THE DISCLOSURE

In the existing video encoding process, as shown in FIG. 1, if different blocks in a frame of a video are encoded with a high resolution, when a transmission bandwidth is relatively small (for example, less than a bandwidth threshold Th shown in FIG. 1), a peak signal-to-noise ratio (PSNR) 1 corresponding to a case in which the different blocks in the frame of the video are encoded with a high resolution is lower than a PSNR 2 corresponding to a case in which the different blocks in the frame of the video are encoded with a low resolution. In other words, when the transmission bandwidth is relatively small, the PSNR 1 corresponding to a case in which a high resolution is used for encoding is relatively small, and distortion is relatively large.

Similarly, if different blocks in a frame of the video are encoded with a low resolution, when the transmission bandwidth is relatively large (for example, greater than the bandwidth threshold Th shown in FIG. 1), a PSNR 3 corresponding to the case in which the different blocks in the frame of the video are encoded with a low resolution is lower than a PSNR 4 corresponding to a case in which the different blocks in the frame of the video are encoded with a high resolution. In other words, when the transmission bandwidth is relatively large, the PSNR 3 corresponding to a case in which a low resolution is used for encoding is relatively small, and distortion is relatively large.

In addition, for different types of videos, different frames in the same video, or different blocks in the same frame, an intersection D shown in FIG. 1 moves, which increases the difficulty in selecting a resolution for encoding frames in a video in the related art.

For the foregoing problems, no effective solution has been provided yet.

SUMMARY

A video decoding method is performed at an electronic device, the method including:
  obtaining a current video frame, the current video frame being partitioned into a plurality of regions;
  obtaining a syntax element carried in syntax data corresponding to each of the plurality of regions, the syntax element being used for indicating a resolution used to decode the region, and a plurality of resolutions used to decode the plurality of regions including at least two different resolutions; and
  decoding the each of the plurality of regions by using the resolution corresponding to the region.

A video encoding method is performed at an electronic device, the method including:
  obtaining a current video frame, the current video frame being partitioned into a plurality of regions;
  encoding each of the plurality of regions by using a corresponding resolution in a plurality of resolutions to obtain encoded data corresponding to the region, the plurality of resolutions including at least two different resolutions; and
  adding a syntax element to the encoded data corresponding to the region according to the resolution corresponding to the region, the syntax element being used for indicating the resolution used to encode the region.

One or more non-transitory computer-readable storage media storing computer-readable instructions are provided, the computer-readable instructions, when executed by one or more processors, causing the one or more processors to perform the following steps:
  obtaining a current frame, the current video frame being partitioned into a plurality of regions;
  obtaining a syntax element carried in syntax data corresponding to each of the plurality of regions, the syntax element being used for indicating a resolution used to decode the region, and a plurality of resolutions used to decode the plurality of regions including at least two different resolutions; and
  decoding the each of the plurality of regions by using the resolution corresponding to the region.

An electronic device is provided, including a memory and one or more processors, the memory storing computer-readable instructions, the computer-readable instructions, when executed by the one or more processors, causing the one or more processors to perform the following steps:
  obtaining a current video frame, the current video frame being partitioned into a plurality of regions;
  obtaining a syntax element carried in syntax data corresponding to each of the plurality of regions, the syntax element being used for indicating a resolution used to decode the region, and a plurality of resolutions used to decode the plurality of regions including at least two different resolutions; and decoding the each of the plurality of regions by using the resolution corresponding to the region.

One or more non-transitory computer-readable storage media storing computer-readable instructions are provided, the computer-readable instructions, when executed by one or more processors, causing the one or more processors to perform the following steps:

obtaining a current video frame, the current video frame being partitioned into a plurality of regions;

encoding each of the plurality of regions by using a corresponding resolution in a plurality of resolutions to obtain encoded data corresponding to the region, the plurality of resolutions including at least two different resolutions; and adding a syntax element to the encoded data corresponding to the region according to the resolution corresponding to the region, the syntax element being used for indicating the resolution used to encode the region.

An electronic device is provided, including a memory and one or more processors, the memory storing computer-readable instructions, the computer-readable instructions, when executed by the one or more processors, causing the one or more processors to perform the following steps:

obtaining a current video frame, the current video frame being partitioned into a plurality of regions;

encoding each of the plurality of regions by using a corresponding resolution in a plurality of resolutions to obtain encoded data corresponding to the region, the plurality of resolutions including at least two different resolutions; and adding a syntax element to the encoded data corresponding to the region according to the resolution corresponding to the region, the syntax element being used for indicating the resolution used to encode the region.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, the claims, and the accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 2:
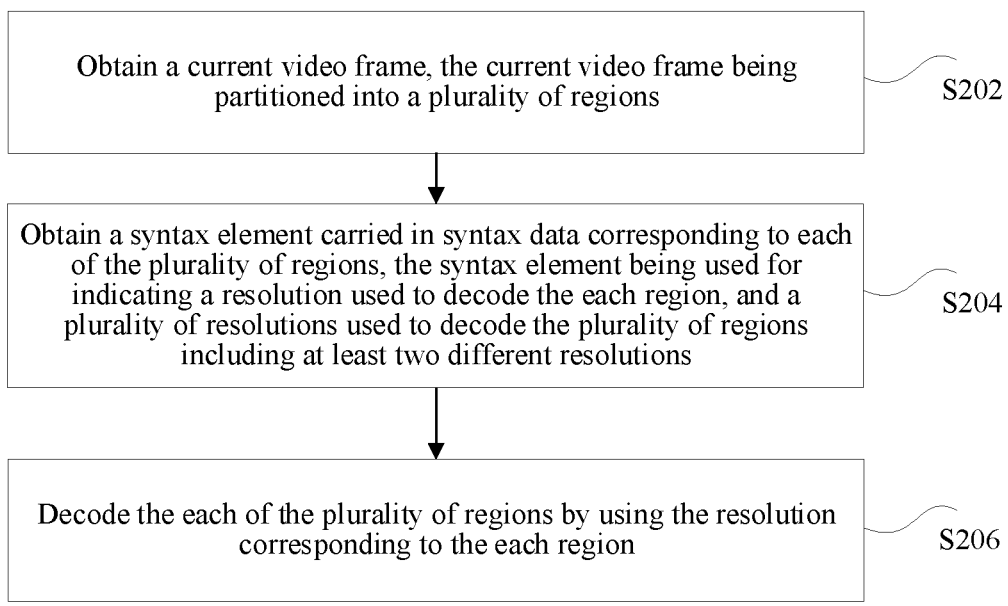
FIG. 2 is a schematic diagram of an exemplary video decoding method according to an embodiment of this application.

According to an aspect of the embodiments of this application, a video decoding method is provided. As shown in FIG. 2, the method includes the following steps:

S202. Obtain a current video frame to be decoded, the current video frame being partitioned into a plurality of regions.

S204. Obtain a syntax element carried in syntax data corresponding to each of the plurality of regions, the syntax element being used for indicating a resolution used to decode the region, and a plurality of resolutions used to decode the plurality of regions including at least two different resolutions. In some embodiments, the plurality of resolutions are determined according to a transmission bandwidth of a video stream including the current video frame from a source (e.g., a video server 302) to a destination (e.g., a client terminal 304), e.g., by comparing the transmission bandwidth with a preset bandwidth threshold.

S206. Decode the each of the plurality of regions by using the resolution corresponding to the region.

Figure 3:
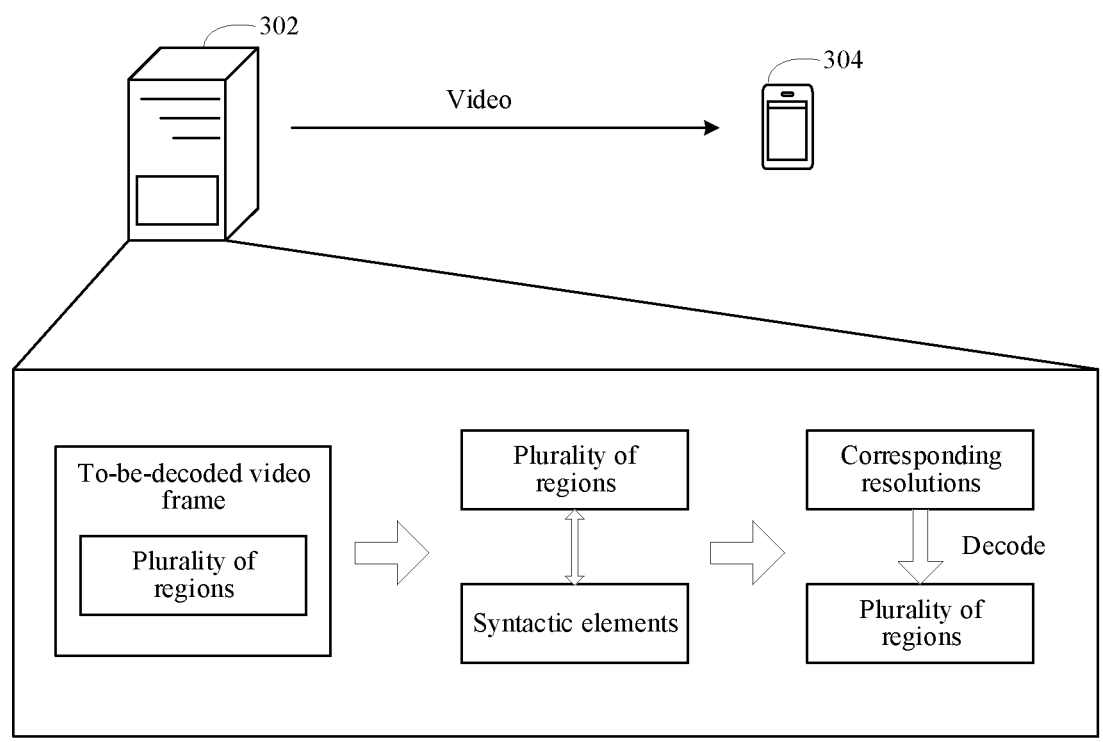
FIG. 3 is a schematic diagram of an application environment of an exemplary video decoding method according to an embodiment of this application.

In some embodiments, the video decoding method may be applied to a hardware environment formed by a server 302 and a client 304 shown in FIG. 3. As shown in FIG. 3, the server 302 obtains a current video frame, the current video frame being partitioned into a plurality of regions; obtains a syntax element carried in syntax data corresponding to each of the plurality of regions, the syntax element being used for indicating a resolution used to decode the region, and a plurality of resolutions used to decode the plurality of regions including at least two different resolutions; and decodes the each of the plurality of regions by using the resolution corresponding to the region. The server 302 sends the decoded video to the client 304 for playing.

In some embodiments, the video decoding method may be applied to, but not limited to, a scenario of audio and video processing. For example, a client A and a client B make a video call. The client A and the client B respectively capture video images, encode the captured video images, and send the encoded video to the other party. The other party decodes the received video and plays the decoded video.

In some embodiments, the video decoding method may be further applied to, but not limited to, scenarios such as the playback of video files and live video streaming.

The foregoing client may be, but is not limited to, various applications, for example, an on-line education application, an instant messaging application, a community space application, a game application, a shopping application, a browser application, a financial application, a multimedia application, and a live streaming application. Specifically, the client may be applied to, but not limited to, a scenario in which audio and video are processed in the foregoing instant messaging application, or may be applied to, but not limited to, a scenario in which audio and video are processed in the foregoing multimedia application, to avoid relatively large fluctuations in a PSNR of video encoding and decoding. This is merely an example and is not limited in this embodiment.

In some embodiments, different regions in the current video frame are obtained through encoding by using different resolutions. For example, the current video frame is partitioned into four regions: a region 1, a region 2, a region 3, and a region 4. The region 1 is encoded by using a resolution 1, the region 2 and the region 3 are encoded by using a resolution 2, and the region 4 is encoded by using a resolution 3. The encoding information is indicated by syntax elements carried in syntax data. A decoder side obtains the different resolutions used in the different regions by obtaining the syntax elements, to decode the regions by using the resolutions corresponding to the regions.

In some embodiments, the plurality of regions included in the current video frame are decoded by using at least two different resolutions.

In some embodiments, the syntax element used for indicating the resolution used to decode each region may be a piece of data located at a fixed position of the current video frame. At the position, different data values represent different resolutions. The syntax elements may be obtained by searching the position on the current video frame, to determine the different resolutions of the regions.

Figure 4:
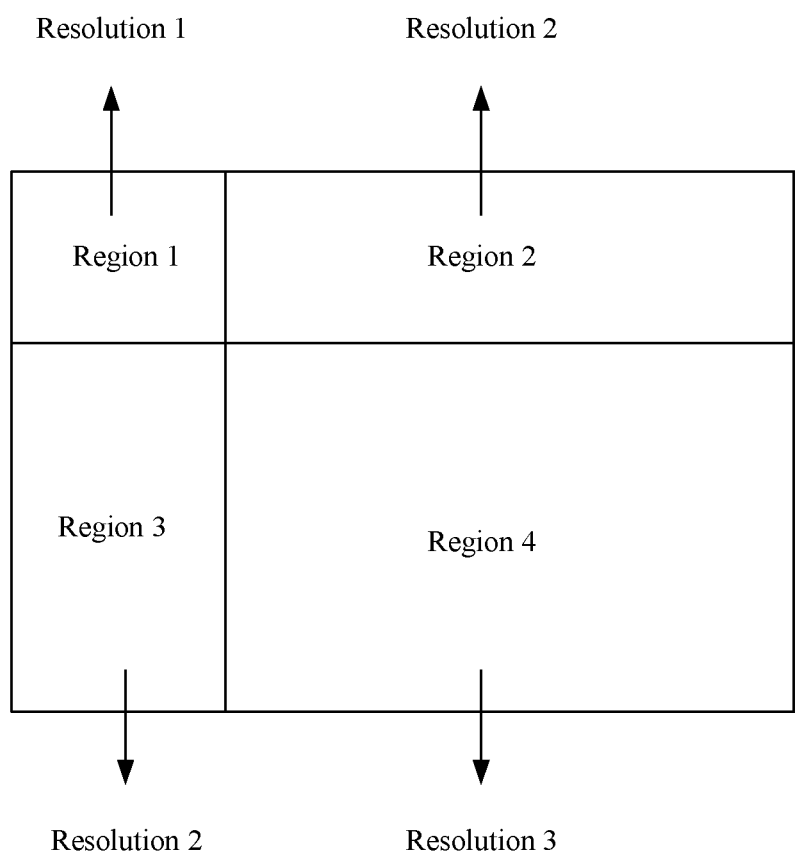
FIG. 4 is a schematic diagram of an exemplary video decoding method according to an embodiment of this application.

In an implementation, as shown in FIG. 4, a current video frame is obtained. The current video frame is partitioned into a plurality of regions, including: a region 1, a region 2, a region 3, and a region 4. A syntax element carried in syntax data corresponding to each of the plurality of regions is obtained, where a syntax element corresponding to the region 1 is used for indicating that a resolution used to decode the region 1 is a resolution 1, a syntax element corresponding to the region 2 is used for indicating that a resolution used to decode the region 2 is a resolution 2, a syntax element corresponding to the region 3 is used for indicating that a resolution used to decode the region 3 is the resolution 2, and a syntax element corresponding to the region 4 is used for indicating that a resolution used to decode the region 4 is a resolution 3. The resolution 1 is used to decode the region 1, the resolution 2 is used to decode the region 2 and the region 3, and the resolution 3 is used to decode the region 4.

As can be seen, through the foregoing steps, different blocks in a frame of a video are adaptively encoded by using corresponding resolutions. In this way, regardless of whether a transmission bandwidth is relatively small or whether the transmission bandwidth is relatively large, a corresponding PSNR is relatively large, and the distortion is relatively small, thereby ensuring that the PSNR can change within a relatively small range. In addition, the PSNR is relatively large, thereby achieving a technical effect of avoiding relatively large fluctuations in the PSNR of video encoding and decoding, and further resolving the technical problem of relatively large fluctuations in the PSNR due to the use of the same resolution for video encoding and decoding in the related art.

In an implementation, the obtaining a syntax element carried in syntax data corresponding to each of the plurality of regions includes:

obtaining an identification value corresponding to the region, the identification value corresponding to the region being used for indicating the resolution used to decode the region.

In some embodiments, different identification values may be directly used in syntax elements to indicate different resolutions. For example, the resolution 1 is represented by 00, the resolution 2 is represented by 01, the resolution 3 is represented by 10, and the resolution 4 is represented by 11. The manner of representing a resolution by using an identification value is not limited thereto. Various identification value representation manners that can distinguish resolutions may be used to indicate different resolutions used in different regions.

Figure 5:
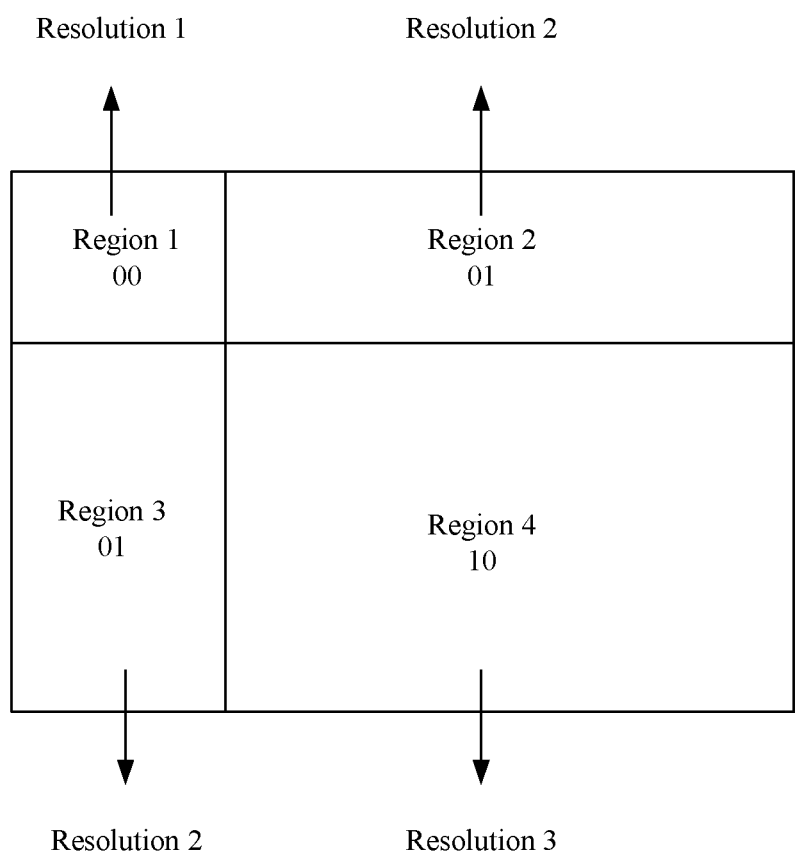
FIG. 5 is a schematic diagram of another exemplary video decoding method according to an embodiment of this application.

In an implementation, as shown in FIG. 5, a current video frame is obtained. The current video frame is partitioned into a plurality of regions, including: a region 1, a region 2, a region 3, and a region 4. An identification value corresponding to each of the plurality of regions is obtained. An identification value corresponding to the region 1 is 00, and it can be determined that a resolution used to decode the region 1 is a resolution 1; an identification value corresponding to the region 2 is 01, and it can be determined that a resolution used to decode the region 2 is a resolution 2; an identification value corresponding to the region 3 is 01, and it can be determined that a resolution used to decode the region 3 is the resolution 2; and an identification value corresponding to the region 4 is 10, and it can be determined that a resolution used to decode the region 4 is a resolution 3. The resolution 1 is used to decode the region 1, the resolution 2 is used to decode the region 2 and the region 3, and the resolution 3 is used to decode the region 4.

In an implementation, the obtaining a syntax element carried in syntax data corresponding to each of the plurality of regions includes:

obtaining an identification value corresponding to the region, the identification value corresponding to the region being used for indicating a relationship between the resolution used to decode the region and a resolution used to decode a previous region of the region; and determining, according to the identification value and the resolution used to decode the previous region of the region, the resolution used to decode the region.

In some embodiments, an identification value corresponding to a current region may be used for indicating a relationship between a resolution of the current region and a resolution of a previous region of the current region. The resolution of the current region is then determined according to the relationship and the resolution of the previous region.

In an implementation, the determining, according to the identification value and the resolution used to decode the previous region of the region, the resolution used to decode the region further includes:

determining, in response to determining that the identification value corresponding to the region is a first identification value, that the resolution used to decode the region is the resolution corresponding to the previous region of the region; and determining, in response to determining that the identification value corresponding to the region is a second identification value, that the resolution used to decode the region is a resolution different from the resolution corresponding to the previous region of the region.

In some embodiments, the relationship between the resolutions may include, but is not limited to: the resolutions being the same or the resolutions being different. The first identification value is used to indicate that the resolutions are the same, and the second identification value is used to indicate that the resolutions are different. For example, 1 is used to indicate that the resolutions are the same, and 0 is used to indicate that the resolutions are different; or 0 is used to indicate that the resolutions are the same, and 1 is used to indicate that the resolutions are different.

In some embodiments, for the first region in each frame, an identification value may be used to directly indicate a resolution used in the region, or an identification value may alternatively be used to indicate a relationship between resolutions of the region and a last region in a previous frame.

Figure 6:
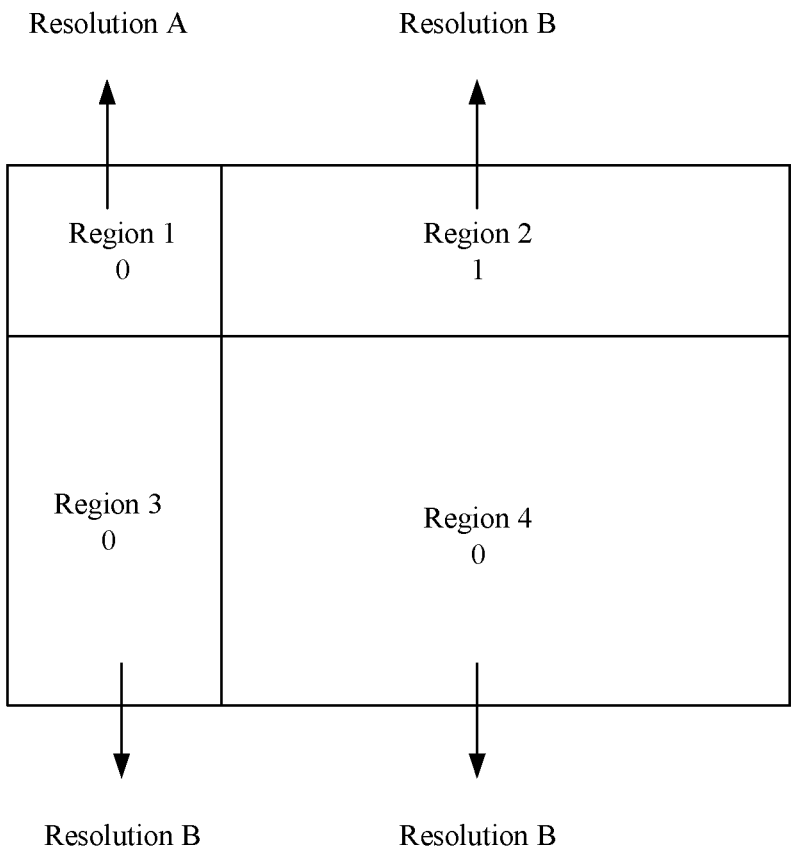
FIG. 6 is a schematic diagram of still another exemplary video decoding method according to an embodiment of this application.

In the foregoing implementation, as shown in FIG. 6, 0 is used to indicate that the resolutions are the same, and 1 is used to indicate that the resolutions are different. The resolutions used for decoding include a resolution A and a resolution B. A current video frame is obtained. The current video frame is partitioned into a plurality of regions, including: a region 1, a region 2, a region 3, and a region 4. An identification value corresponding to each of the plurality of regions is obtained. An identification value corresponding to the region 1 is 0, it can be determined that a resolution used in a last region of a previous frame is the resolution A, and it can be determined that a resolution used to decode the region 1 is the resolution A; an identification value corresponding to the region 2 is 1, and it can be determined that a resolution used to decode the region 2 is the resolution B; an identification value corresponding to the region 3 is 0, and it can be determined that a resolution used to decode the region 3 is the resolution B; and an identification value corresponding to the region 4 is 0, and it can be determined that a resolution used to decode the region 4 is the resolution B.

In an implementation, the partitioning the current video frame into the plurality of regions includes one of the following:

the plurality of regions are a plurality of video blocks obtained by partitioning the current video frame based on a predetermined video codec standard;
the plurality of regions are regions obtained by partitioning the current video frame in response to an obtained inputted region partition instruction; and
the plurality of regions are a plurality of tile regions.

Figure 7:
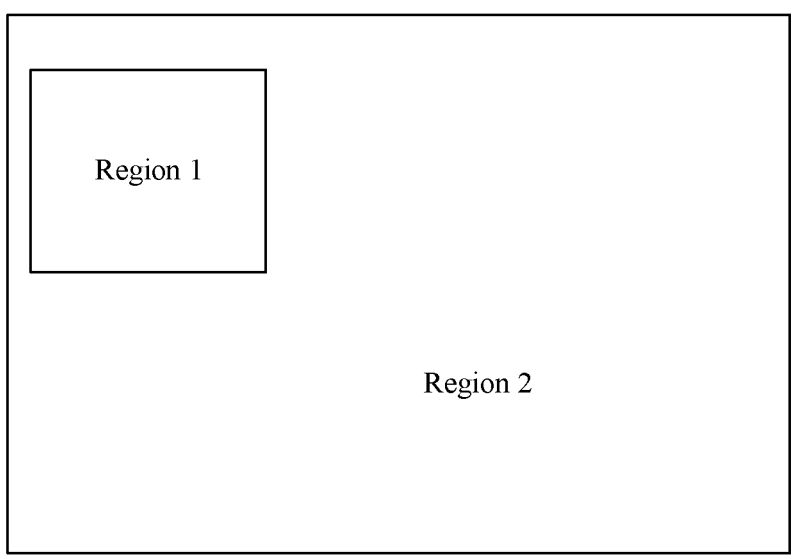
FIG. 7 is a schematic diagram of still another exemplary video decoding method according to an embodiment of this application.

In some embodiments, the plurality of regions may be obtained by using various partitioning methods, including, but not limited to, video block partitioning methods in standard protocols, such as using a binary tree, a triple tree, or a quadtree. Each video block is a region. Alternatively, the partitioning manner of the regions may be indicated by the inputted region partition instruction. For example, as shown in FIG. 7, during a video call, a smaller video window is defined as a region 1, and a larger video window or a part other than the smaller video window is defined as a region 2. The region partitioning manner may alternatively be other partitioning standards, such as a tile region partitioning manner of partitioning a frame into different tile regions.

Figure 8:
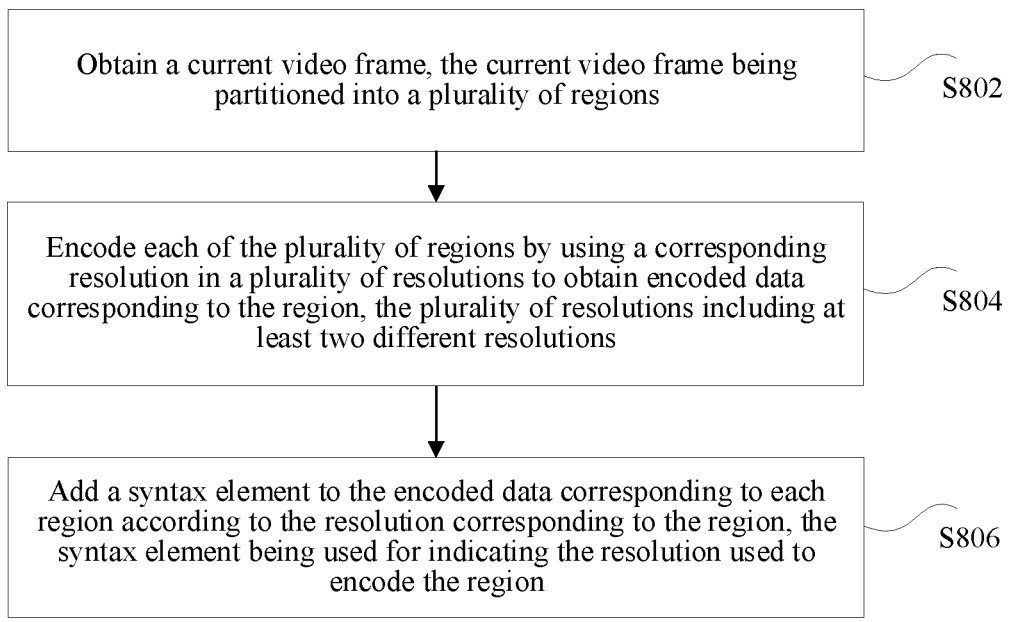
FIG. 8 is a schematic diagram of an exemplary video decoding method according to an embodiment of this application.

According to another aspect of the embodiments of this application, a video encoding method is provided. As shown in FIG. 8, the method includes the following steps:

S802. Obtain a current video frame to be encoded, the current video frame being partitioned into a plurality of regions.

S804. Encode each of the plurality of regions by using a corresponding resolution in a plurality of resolutions to obtain encoded data corresponding to the region, the plurality of resolutions including at least two different resolutions. In some embodiments, the plurality of resolutions are determined according to a transmission bandwidth of a video stream including the current video frame from a source (e.g., a client terminal 904) to a destination (e.g., a video server 902), e.g., by comparing the transmission bandwidth with a preset bandwidth threshold.

S806. Add a syntax element to the encoded data corresponding to the region according to the resolution corresponding to the region, the syntax element being used for indicating the resolution used to encode the region.

Figure 9:
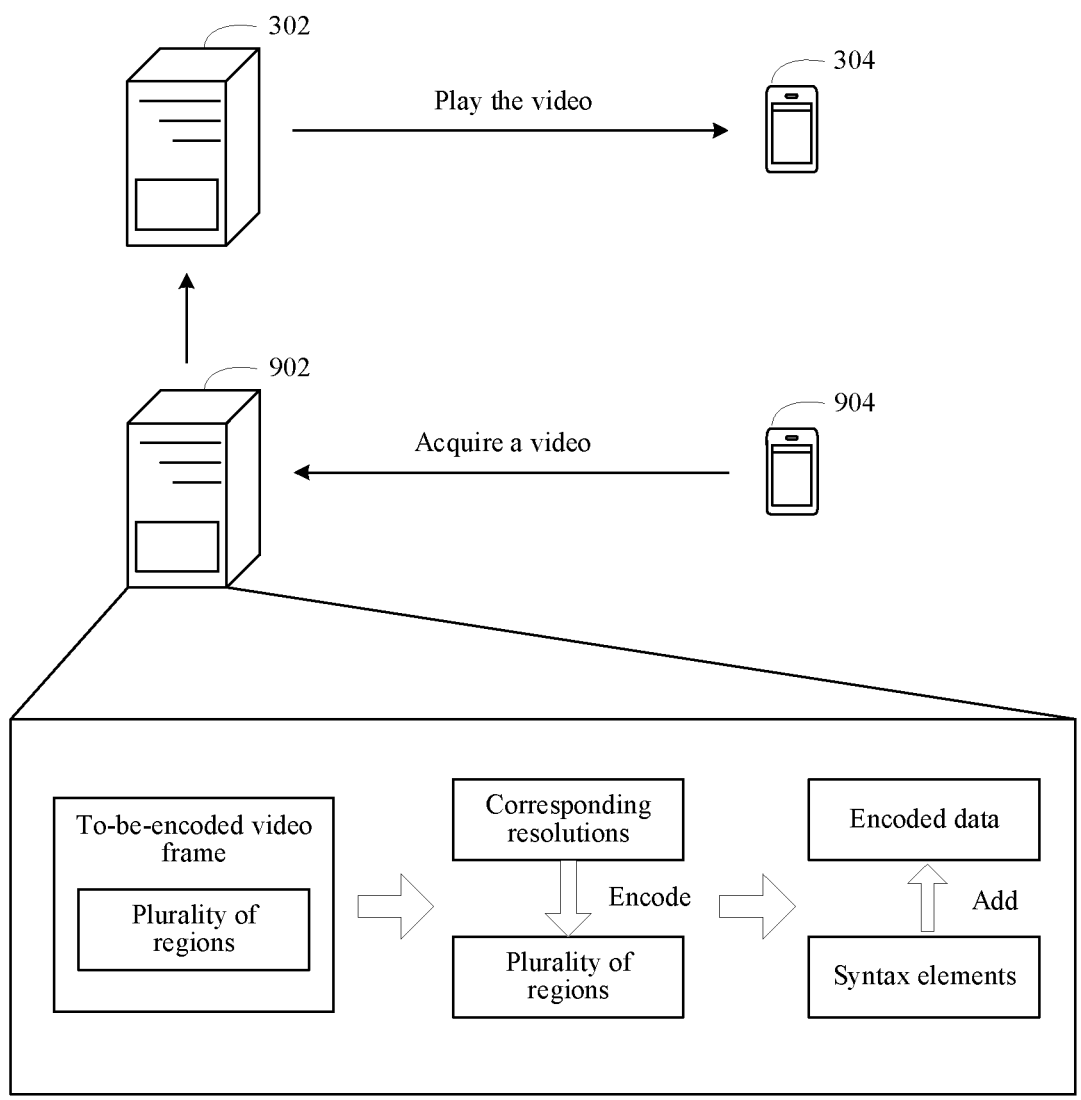
FIG. 9 is a schematic diagram of an application environment of an exemplary video decoding method according to an embodiment of this application.

In some embodiments, the video encoding method may be applied to a hardware environment including a server 902, a server 302, a client 904, and a client 304 shown in FIG. 9. As shown in FIG. 9, the server 902 obtains a current video frame captured by the client 904, the current video frame being partitioned into a plurality of regions; encodes each of the plurality of regions by using a corresponding resolution in a plurality of resolutions to obtain encoded data corresponding to the region, the plurality of resolutions including at least two different resolutions; and adds a syntax element to the encoded data corresponding to the region according to the resolution corresponding to the region, the syntax element being used for indicating the resolution used to encode the region. The server 902 sends the encoded video to the server 302 for decoding. The server 302 sends the decoded video to the client 304 for playing.

In some embodiments, the video encoding method may be applied to, but not limited to, a scenario of audio and video processing. For example, a client A and a client B make a video call. The client A and the client B respectively capture video images, encode the captured video images, and send the encoded video to the other party. The other party decodes the received video and plays the decoded video.

In some embodiments, the video encoding method may be further applied to, but not limited to, scenarios such as the playback of video files and live video streaming.

The foregoing client may be, but is not limited to, various applications, for example, an on-line education application, an instant messaging application, a community space application, a game application, a shopping application, a browser application, a financial application, a multimedia application, and a live streaming application. Specifically, the client may be applied to, but not limited to, a scenario in which audio and video are processed in the foregoing instant messaging application, or may be applied to, but not limited to, a scenario in which audio and video are processed in the foregoing multimedia application, to avoid relatively large fluctuations in a PSNR of video encoding and decoding. This is merely an example and is not limited in this embodiment.

In some embodiments, different regions in the current video frame are encoded by using different resolutions. For example, the current video frame is partitioned into four regions: a region 1, a region 2, a region 3, and a region 4. The region 1 is encoded by using a resolution 1, and a syntax element used for representing the resolution 1 is added to the region 1; the region 2 and the region 3 are encoded by using a resolution 2, and a syntax element used for representing the resolution 2 is added to each of the region 2 and the region 3; and the region 4 is encoded by using a resolution 3, and a syntax element used for representing the resolution 3 is added to the region 4.

In some embodiments, the plurality of regions included in the current video frame are encoded by using at least two different resolutions.

In some embodiments, the syntax element used for indicating the resolution used to encode each region may be a piece of data located at a fixed position of the current video frame. At the position, different data values represent different resolutions. The syntax element representing the resolution corresponding to the region may be added at this position.

Figure 10:
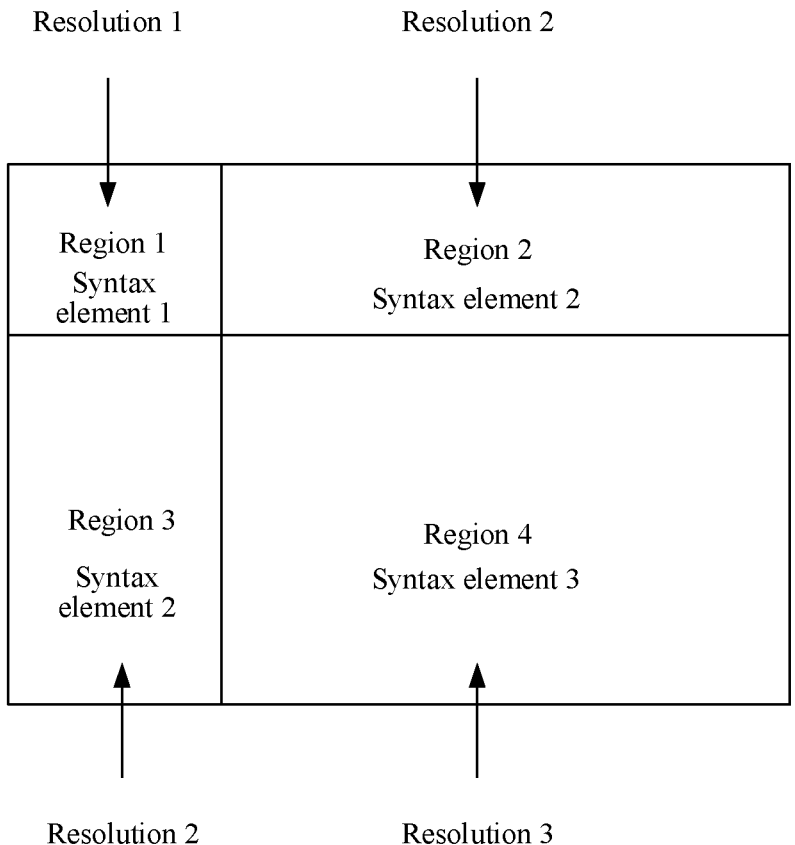
FIG. 10 is a schematic diagram of an exemplary video encoding method according to an embodiment of this application.

In an implementation, as shown in FIG. 10, a current video frame is obtained. The current video frame is partitioned into a plurality of regions, including: a region 1, a region 2, a region 3, and a region 4. A resolution 1 is used to encode the region 1, a resolution 2 is used to encode the region 2 and the region 3, and a resolution 3 is used to encode the region 4. A syntax element 1 used for representing the resolution 1 is added to encoded data corresponding to the region 1, a syntax element 2 used for representing the resolution 2 is added to encoded data corresponding to the region 2 and encoded data corresponding to the region 3, and a syntax element 3 used for representing the resolution 3 is added to encoded data corresponding to the region 4.

As can be seen, through the foregoing steps, different blocks in a frame of a video are adaptively encoded by using corresponding resolutions. In this way, regardless of whether a transmission bandwidth is relatively small or whether the transmission bandwidth is relatively large, a corresponding PSNR is relatively large, and the distortion is relatively small, thereby ensuring that the PSNR can change within a relatively small range. In addition, the PSNR is relatively large, thereby achieving a technical effect of avoiding relatively large fluctuations in the PSNR of video encoding and decoding, and further resolving the technical problem of relatively large fluctuations in the PSNR due to the use of the same resolution for video encoding and decoding in the related art.

In an implementation, the adding a syntax element to the encoded data corresponding to the region according to the resolution corresponding to the region includes:

determining an identification value corresponding to the resolution corresponding to the region in a plurality of identification values, different resolutions in the plurality of resolutions being corresponding to different identification values in the plurality of identification values; and adding the identification value corresponding to the region as the syntax element to the encoded data corresponding to the region.

In some embodiments, different identification values may be directly used in syntax elements to indicate different resolutions. For example, the resolution 1 is represented by 00, the resolution 2 is represented by 01, the resolution 3 is represented by 10, and the resolution 4 is represented by 11. The manner of representing a resolution by using an identification value is not limited thereto. Various identification value representation manners that can distinguish resolutions may be used to indicate different resolutions used in different regions.

In an implementation, the adding a syntax element to the encoded data corresponding to the region according to the resolution corresponding to the region includes:

determining an identification value corresponding to the region according to a relationship between the resolution corresponding to the region and a resolution corresponding to a previous region of the region; and adding the identification value corresponding to the region as the syntax element to the encoded data corresponding to the region.

In some embodiments, an identification value corresponding to a current region may be used for indicating a relationship between a resolution of the current region and a resolution of a previous region of the current region. The identification value corresponding to the region is determined according to the relationship between the resolution of the current region and the resolution of the previous region.

In an implementation, the determining an identification value corresponding to the region according to a relationship between the resolution corresponding to the region and a resolution corresponding to a previous region of the region includes:

determining that the identification value corresponding to the region is a first identification value when the resolution corresponding to the region is the same as the resolution corresponding to the previous region of the region; and determining that the identification value corresponding to the region is a second identification value when the resolution corresponding to the region is different from the resolution corresponding to the previous region of the region.

In some embodiments, the relationship between the resolutions may include, but is not limited to: the resolutions being the same or the resolutions being different. The first identification value is used to indicate that the resolutions are the same, and the second identification value is used to indicate that the resolutions are different. For example, 1 is used to indicate that the resolutions are the same, and 0 is used to indicate that the resolutions are different; or 0 is used to indicate that the resolutions are the same, and 1 is used to indicate that the resolutions are different.

In some embodiments, for the first region in each frame, an identification value may be used to directly indicate a resolution used in the region, or an identification value may alternatively be used to indicate a relationship between resolutions of the region and a last region in a previous frame.

For ease of description, the foregoing method embodiments are stated as a series of action combinations. However, a person skilled in the art is to learn that this application is not limited to the described sequence of the actions because according to this application, some steps may be performed in another sequence or may be simultaneously performed. In addition, a person skilled in the art is also to learn that the embodiments described in this specification are all exemplary embodiments, and the involved actions and modules are not necessarily required to this application.

Figure 11:
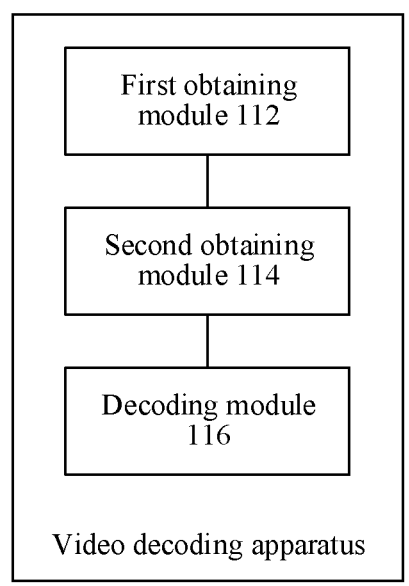
FIG. 11 is a schematic diagram of an exemplary video decoding apparatus according to an embodiment of this application.

According to another aspect of the embodiments of this application, a video decoding apparatus for implementing the foregoing video decoding method is further provided. As shown in FIG. 11, the apparatus includes:

a first obtaining module 112, configured to obtain a to current video frame, the current video frame being partitioned into a plurality of regions;

a second obtaining module 114, configured to obtain a syntax element carried in syntax data corresponding to each of the plurality of regions, the syntax element being used for indicating a resolution used to decode the region, and a plurality of resolutions used to decode the plurality of regions including at least two different resolutions; and a decoding module 116, configured to decode the each of the plurality of regions by using the resolution corresponding to the region.

In some embodiments, the second obtaining module 114 includes:

a first obtaining unit, configured to obtain an identification value corresponding to the region, the identification value corresponding to the region being used for indicating the resolution used to decode the region.

In some embodiments, the second obtaining module 114 includes:

a second obtaining unit, configured to obtain an identification value corresponding to the region, the identification value corresponding to the region being used for indicating a relationship between the resolution used to decode the region and a resolution used to decode a previous region of the region; and a first determining unit, configured to determine, according to the identification value and the resolution used to decode the previous region of the region, the resolution used to decode the region.

In some embodiments, the second obtaining module 114 includes:

a second determining unit, configured to determine, in response to determining that the identification value corresponding to the region is a first identification value, that the resolution used to decode the region is the resolution corresponding to the previous region of the region; and a third determining unit, configured to determine, in response to determining that the identification value corresponding to the region is a second identification value, that the resolution used to decode the region is a resolution different from the resolution corresponding to the previous region of the region.

In some embodiments, a manner of partitioning the current video frame into the plurality of regions includes one of the following:

the plurality of regions are a plurality of video blocks obtained by partitioning the current video frame based on a predetermined video codec standard;

the plurality of regions are regions obtained by partitioning the current video frame in response to an obtained inputted region partition instruction; and the plurality of regions are a plurality of tile regions.

Figure 12:
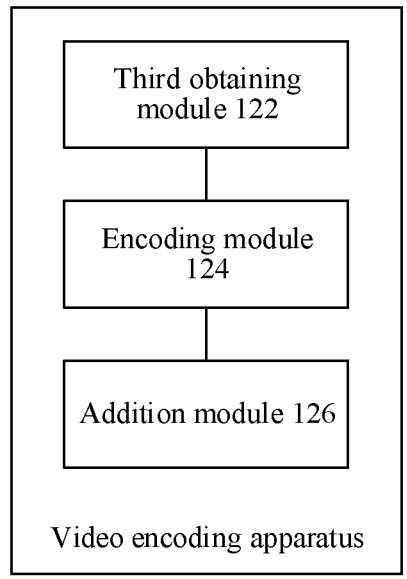
FIG. 12 is a schematic diagram of an exemplary video encoding apparatus according to an embodiment of this application.

According to another aspect of the embodiments of this application, a video encoding apparatus for implementing the foregoing video encoding method is further provided. As shown in FIG. 12, the apparatus includes:

a third obtaining module 122, configured to obtain a current video frame, the current video frame being partitioned into a plurality of regions;

an encoding module 124, configured to encode each of the plurality of regions by using a corresponding resolution in a plurality of resolutions to obtain encoded data corresponding to the region, the plurality of resolutions including at least two different resolutions; and an addition module 126, configured to add a syntax element to the encoded data corresponding to the region according to the resolution corresponding to the region, the syntax element being used for indicating the resolution used to encode the region.

In some embodiments, the addition module 126 includes:

a fourth determining unit, configured to determine an identification value corresponding to the resolution corresponding to the region in a plurality of identification values, different resolutions in the plurality of resolutions being corresponding to different identification values in the plurality of identification values; and a first addition unit, configured to add the identification value corresponding to the region as the syntax element to the encoded data corresponding to the region.

In some embodiments, the addition module 126 includes:

a fifth determining unit, configured to determine an identification value corresponding to the region according to a relationship between the resolution corresponding to the region and a resolution corresponding to a previous region of the region; and a second addition unit, configured to add the identification value corresponding to the region as the syntax element to the encoded data corresponding to the region.

In some embodiments, the fifth determining unit includes:

a first determining subunit, configured to determine that the identification value corresponding to the region is a first identification value when the resolution corresponding to the region is the same as the resolution corresponding to the previous region of the region; and a second determining subunit, configured to determine that the identification value corresponding to the region is a second identification value when the resolution corresponding to the region is different from the resolution corresponding to the previous region of the region.

For an application environment of this embodiment of this application, reference may be made to, but is not limited to, the application environment of the foregoing embodiment, and details are not repeated in this embodiment. This embodiment of this application provides a specific application example for implementing the foregoing video encoding and decoding methods. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 13:
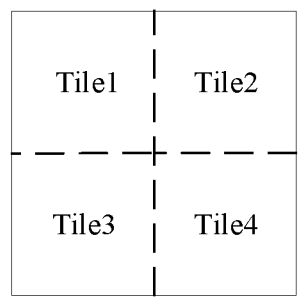
FIG. 13 is a schematic diagram of an application scenario of video encoding and decoding methods according to an embodiment of this application.

In an embodiment, the foregoing video encoding and decoding methods may be applied to, but not limited to, a scenario of video encoding and decoding as shown in FIG. 13. In this scenario, for a tth frame to be encoded in the video, a region in the tth frame is partitioned into different tile regions, including a Tile1 region, a Tile2 region, a Tile3 region, and a Tile4 region shown in FIG. 13. The partitioning manner in FIG. 13 is merely an example, and the quantity and shape of regions obtained by partitioning a frame are not limited in this embodiment of this application.

Subsequently, different resolutions are respectively used to calculate costs (rate distortion costs) in different tile regions, and a resolution corresponding to a lowest rate distortion cost is used as the resolution used on a tile region. For example, for the Tile1 region, a resolution 1, a resolution 2, and a resolution 3 in a predetermined resolution set are respectively used to calculate corresponding rate distortion costs, and the resolution 2 corresponds to the lowest rate distortion cost. In this case, the resolution 2 is used to encode blocks in the Tile1 region.

By means of the above method, it is determined that the resolution 2 is used to encode blocks in the Tile1 region, the resolution 1 is used to encode blocks in the Tile2 region, the resolution 1 is used to encode blocks in the Tile3 region, and the resolution 3 is used to encode blocks in the Tile4 region.

In an embodiment, to enable the decoder side to learn resolutions used in encoding of different blocks in a video frame, corresponding flag bits may be used during encoding to represent the corresponding resolutions. For example, for a block encoded by using a high resolution in an encoded frame, a corresponding flag bit is set to 0; and for a block encoded by using a low resolution in the encoded frame, a corresponding flag bit is set to 1. Certainly, this setting manner is merely an example, and other flag bit setting manners may alternatively be used. For example, for a block encoded by using a high resolution, a corresponding flag bit is set to 1; and for a block encoded by using a low resolution, a corresponding flag bit is set to 0.

In another embodiment, to enable the decoder side to learn resolutions used in encoding of different blocks in a video frame, corresponding flag bits may be used during encoding to represent the corresponding resolutions. For example, if a resolution used in a current block is the same as that used in a previous block during encoding, a flag bit corresponding to the current block is set to 0; and if the resolution used in the current block is different from that used in the previous block during encoding, the flag bit corresponding to the current block is set to 1. Certainly, this setting manner is merely an example, and other flag bit setting manners may alternatively be used. For example, if a resolution used in a current block is the same as that used in a previous block during encoding, a flag bit corresponding to the current block is set to 1; and if the resolution used in the current block is different from that used in the previous block during encoding, the flag bit corresponding to the current block is set to 0.

For the flag bit setting manners in the foregoing different embodiments, quantities of to-be-transmitted bits obtained after entropy encoding are different.

Figure 14:
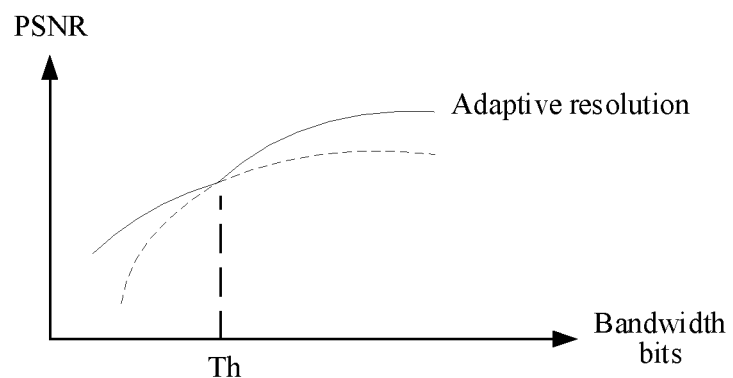
FIG. 14 is a schematic diagram of another application scenario of video encoding and decoding methods according to an embodiment of this application.

As shown in FIG. 14, in the video encoding process of this application, different blocks in a frame of a video are encoded by adaptively using corresponding resolutions, so that regardless of whether a transmission bandwidth is relatively small (for example, less than a bandwidth threshold Th shown in FIG. 14), or whether the transmission bandwidth is relatively large (for example, larger than the bandwidth threshold Th shown in FIG. 14), a corresponding PSNR is relatively large, and distortion is relatively small.

Figure 1:
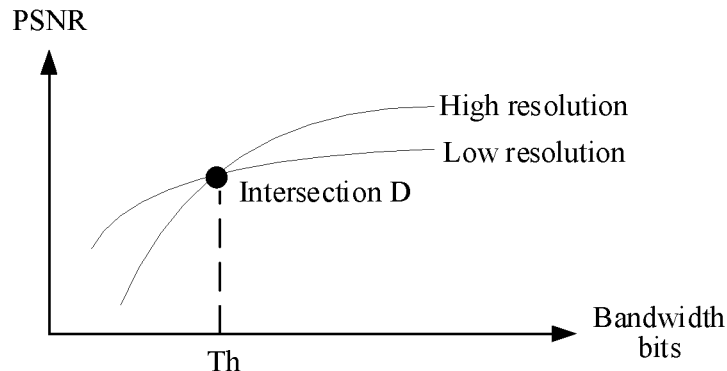
FIG. 1 is a schematic diagram of a PSNR of an encoding and decoding manner in the related art.

In addition, because different blocks in a frame of a video are encoded by adaptively using corresponding resolutions, there is no need to select the corresponding resolutions according to an intersection (for example, an intersection in FIG. 1) corresponding to different types of videos or different frames of the same video or different blocks in the same frame during encoding of frames in the video, which reduces encoding complexity.

Figure 15:
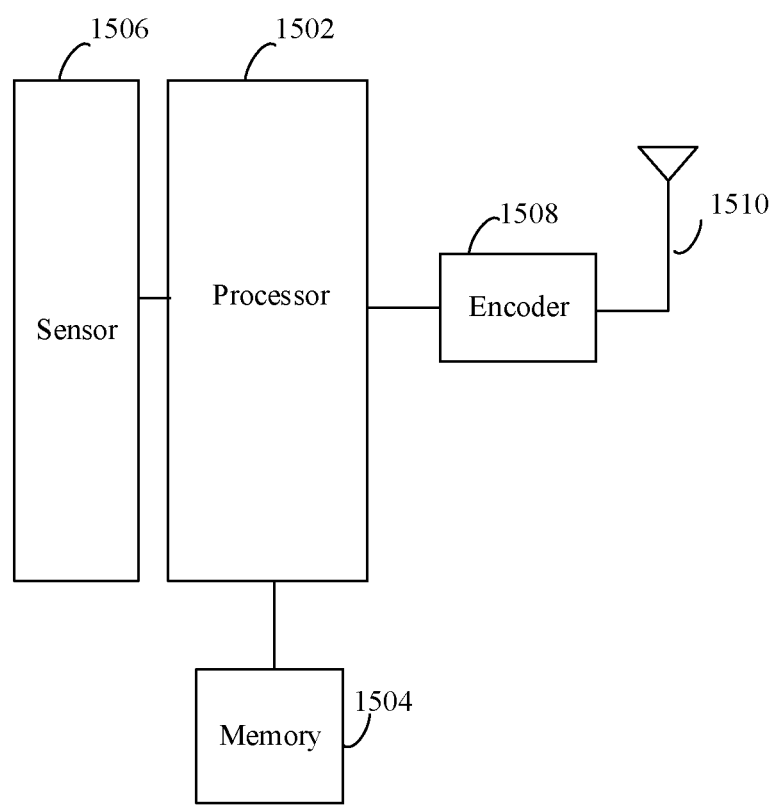
FIG. 15 is a schematic diagram of an electronic device according to an embodiment of this application.

According to still another aspect of the embodiments of this application, an electronic device configured to implement the foregoing video encoding and decoding method is further provided. As shown in FIG. 15, the electronic device includes: one or more (only one is shown in the figure) processors 1502, a memory 1504, a sensor 1506, an encoder 1508, and a transmission apparatus 1510. The memory stores computer-readable instructions, and the processor is configured to perform the steps in any one of the foregoing method embodiments through the computer-readable instructions.

In some embodiments, the electronic device may be located in at least one of a plurality of network devices of a computer network.

In some embodiments, the foregoing processor may be configured to perform the following steps through the computer-readable instructions:
- obtaining a current video frame, the current video frame being partitioned into a plurality of regions;
- obtaining a syntax element carried in syntax data corresponding to each of the plurality of regions, the syntax element being used for indicating a resolution used to decode the region, and a plurality of resolutions used to decode the plurality of regions including at least two different resolutions; and
- decoding the each of the plurality of regions by using the resolution corresponding to the region.

In some embodiments, a person of ordinary skill in the art may understand that, the structure shown in FIG. 15 is only illustrative. The electronic device may be alternatively a terminal device such as a smartphone (for example, an Android mobile phone or an iOS mobile phone), a tablet computer, a palmtop computer, a mobile Internet device (MID), or a PAD. FIG. 15 does not constitute a limitation on a structure of the foregoing electronic device. For example, the electronic device may alternatively include more or fewer components (such as a network interface and a display device) than those shown in FIG. 15, or have a configuration different from that shown in FIG. 15.

The memory 1504 may be configured to store computer-readable instructions and modules, for example, computer-readable instructions/modules corresponding to the video decoding method and apparatus in the embodiments of this application. The processor 1502 runs the computer-readable instructions and modules stored in the memory 1504 to perform various functional applications and data processing, that is, implement the foregoing video encoding and decoding methods. The memory 1504 may include a high-speed random memory, and may also include a non-volatile memory, for example, one or more magnetic storage apparatuses, a flash memory, or another non-volatile solid-state memory. In some embodiments, the memory 1504 may further include memories remotely disposed relative to the processor 1502, and the remote memories may be connected to a terminal through a network. Examples of the network include, but are not limited to, the Internet, an intranet, a local area network, a mobile communication network, and a combination thereof.

The transmission apparatus 1510 is configured to receive or transmit data by using a network. Specific examples of the foregoing network may include a wired network and a wireless network. In an example, the transmission apparatus 1510 includes a network interface controller (NIC). The NIC may be connected to another network device and a router by using a network cable, to communicate with the Internet or a local area network. In an example, the transmission apparatus 1510 is a radio frequency (RF) module, which communicates with the Internet in a wireless manner.

Specifically, the memory 1504 is configured to store an application.

An embodiment of this application further provides a storage medium, storing computer-readable instructions, the computer-readable instructions being configured to perform the steps in any one of the foregoing method embodiments when being run.

In some embodiments, the storage medium may be configured to store computer-readable instructions for performing the following steps:
  obtaining a current video frame, the current video frame being partitioned into a plurality of regions;
  obtaining a syntax element carried in syntax data corresponding to each of the plurality of regions, the syntax element being used for indicating a resolution used to decode the region, and a plurality of resolutions used to decode the plurality of regions including at least two different resolutions; and
  decoding the each of the plurality of regions by using the resolution corresponding to the region.

In some embodiments, the storage medium is further configured to store computer-readable instructions for performing the steps included in the methods according to the foregoing embodiments, and details are not repeated in this embodiment.

In some embodiments, a person of ordinary skill in the art can understand that all or some of the steps of the methods in the foregoing embodiments can be implemented by computer-readable instructions instructing relevant hardware of a terminal device. The computer-readable instructions may be stored in a computer-readable storage medium, and the storage medium may include a flash drive, a read-only memory (ROM), a random access memory (RAM), a magnetic disk, a compact disc, and the like.

The sequence numbers of the foregoing embodiments of this application are merely for description purpose, and are not intended to indicate priorities of the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several computer-readable instructions for instructing one or more computer devices (which may be a PC, a server, a network device or the like) to perform all or some of steps of the methods in the embodiments of this application.

In the foregoing embodiments of this application, the descriptions of the embodiments have respective focuses. For a part that is not described in detail in an embodiment, reference may be made to related descriptions in other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A video decoding method performed by an electronic device, the method comprising:
  obtaining a current video frame, the current video frame being partitioned into a plurality of regions;
  obtaining a syntax element carried in syntax data corresponding to each region of the plurality of regions, the syntax element being used for indicating a resolution used to decode the region, and a plurality of resolutions used to decode the plurality of regions comprising at least two different resolutions, the obtaining including:
    obtaining an identification value corresponding to the region, the identification value indicating a relationship between the resolution used to decode the region and a resolution used to decode a previous region of the plurality of regions; and
    determining, according to the identification value and the resolution used to decode the previous region, the resolution used to decode the region; and
  decoding each region of the plurality of regions by using the respective resolution corresponding to the respective region.

2. The method according to claim 1, wherein the determining, according to the identification value and the resolution used to decode the previous region of the region, the resolution used to decode the region comprises:

determining, in response to determining that the identification value corresponding to the region is a first identification value, that the resolution used to decode the region is the resolution corresponding to the previous region of the region; and determining, in response to determining that the identification value corresponding to the region is a second identification value, that the resolution used to decode the region is a resolution different from the resolution corresponding to the previous region of the region.

3. The method according to claim 1, wherein a manner of partitioning the current video frame into the plurality of regions comprises one of the following:

the plurality of regions are a plurality of video blocks obtained by partitioning the current video frame based on a predetermined video codec standard;

the plurality of regions are regions obtained by partitioning the current video frame in response to an obtained inputted region partition instruction; and the plurality of regions are a plurality of tile regions.

4. The method according to claim 1, wherein the at least two different resolutions are determined according to a transmission bandwidth of a video stream including the current video frame from a source to the electronic device.

5. A video encoding method performed by an electronic device, the method comprising:

obtaining a current video frame, the current video frame being partitioned into a plurality of regions;

encoding each region of the plurality of regions by using a corresponding resolution in a plurality of resolutions to obtain encoded data corresponding to the region, the plurality of resolutions comprising at least two different resolutions; and adding a syntax element to the encoded data corresponding to the region according to the resolution corresponding to the region, the syntax element being used for indicating the resolution used to encode the region, wherein the adding further includes:

determining an identification value corresponding to the region according to a relationship between the resolution corresponding to the region and a resolution corresponding to a previous region of the region; and adding the identification value corresponding to the region as the syntax element.

6. The method according to claim 5, wherein the determining an identification value corresponding to the region according to a relationship between the resolution corresponding to the region and a resolution corresponding to a previous region of the region comprises:

determining that the identification value corresponding to the region is a first identification value when the resolution corresponding to the region is the same as the resolution corresponding to the previous region of the region; and determining that the identification value corresponding to the region is a second identification value when the resolution corresponding to the region is different from the resolution corresponding to the previous region of the region.

7. An electronic device, comprising a memory and one or more processors, the memory storing computer-readable instructions, the computer-readable instructions, when executed by the one or more processors, causing the one or more processors to perform a plurality of operations including:

obtaining a current video frame, the current video frame being partitioned into a plurality of regions;

obtaining a syntax element carried in syntax data corresponding to each region of the plurality of regions, the syntax element being used for indicating a resolution used to decode the region, and a plurality of resolutions used to decode the plurality of regions comprising at least two different resolutions, the obtaining including:

obtaining an identification value corresponding to the region, the identification value corresponding to the region being used for indicating a relationship between the resolution used to decode the region and a resolution used to decode a previous region of the region; and determining, according to the identification value and the resolution used to decode the previous region of the region, the resolution used to decode the region; and decoding each region of the plurality of regions by using the respective resolution corresponding to the respective region.

8. The electronic device according to claim 7, wherein the determining, according to the identification value and the resolution used to decode the previous region of the region, the resolution used to decode the region comprises:

determining, in response to determining that the identification value corresponding to the region is a first identification value, that the resolution used to decode the region is the resolution corresponding to the previous region of the region; and determining, in response to determining that the identification value corresponding to the region is a second identification value, that the resolution used to decode the region is a resolution different from the resolution corresponding to the previous region of the region.

9. The electronic device according to claim 7, wherein a manner of partitioning the current video frame into the plurality of regions comprises one of the following:

the plurality of regions are a plurality of video blocks obtained by partitioning the current video frame based on a predetermined video codec standard;

the plurality of regions are regions obtained by partitioning the current video frame in response to an obtained inputted region partition instruction; and the plurality of regions are a plurality of tile regions.

10. The electronic device according to claim 7, wherein the plurality of operations further comprise:

obtaining a second current video frame, the second current video frame being partitioned into a second plurality of regions;

encoding each second region of the second plurality of regions associated with the second current video frame by using a corresponding resolution in the plurality of resolutions to obtain encoded data corresponding to the second region, the plurality of resolutions comprising at least two different resolutions; and adding a second syntax element to the encoded data corresponding to the second region according to the resolution corresponding to the second region, the second syntax element being used for indicating the resolution used to encode the second region.

11. The electronic device according to claim 10, wherein the adding a second syntax element to the encoded data corresponding to the second region according to the resolution corresponding to the second region comprises:
   determining a second identification value corresponding to the resolution corresponding to the second region in a plurality of identification values, different resolutions in the plurality of resolutions being corresponding to different identification values in the plurality of identification values; and
   adding the second identification value corresponding to the second region as the second syntax element to the encoded data corresponding to the second region.

12. The electronic device according to claim 10, wherein the adding a second syntax element to the encoded data corresponding to the second region according to the resolution corresponding to the second region comprises:
   determining a second identification value corresponding to the second region according to a relationship between the resolution corresponding to the second region and a resolution corresponding to a previous region of the second region; and
   adding the second identification value corresponding to the second region as the second syntax element to the encoded data corresponding to the second region.

13. The electronic device according to claim 12, wherein the determining a second identification value corresponding to the second region according to a relationship between the resolution corresponding to the second region and a resolution corresponding to a previous region of the second region comprises:
   determining that the second identification value corresponding to the second region is a first value when the resolution corresponding to the second region is the same as the resolution corresponding to the previous region of the second region; and
   determining that the second identification value corresponding to the second region is a second value when the resolution corresponding to the second region is different from the resolution corresponding to the previous region of the second region.

14. The electronic device according to claim 7, wherein the at least two different resolutions are determined according to a transmission bandwidth of a video stream including the current video frame from a source to the electronic device.

* * * * *